Figure 1:
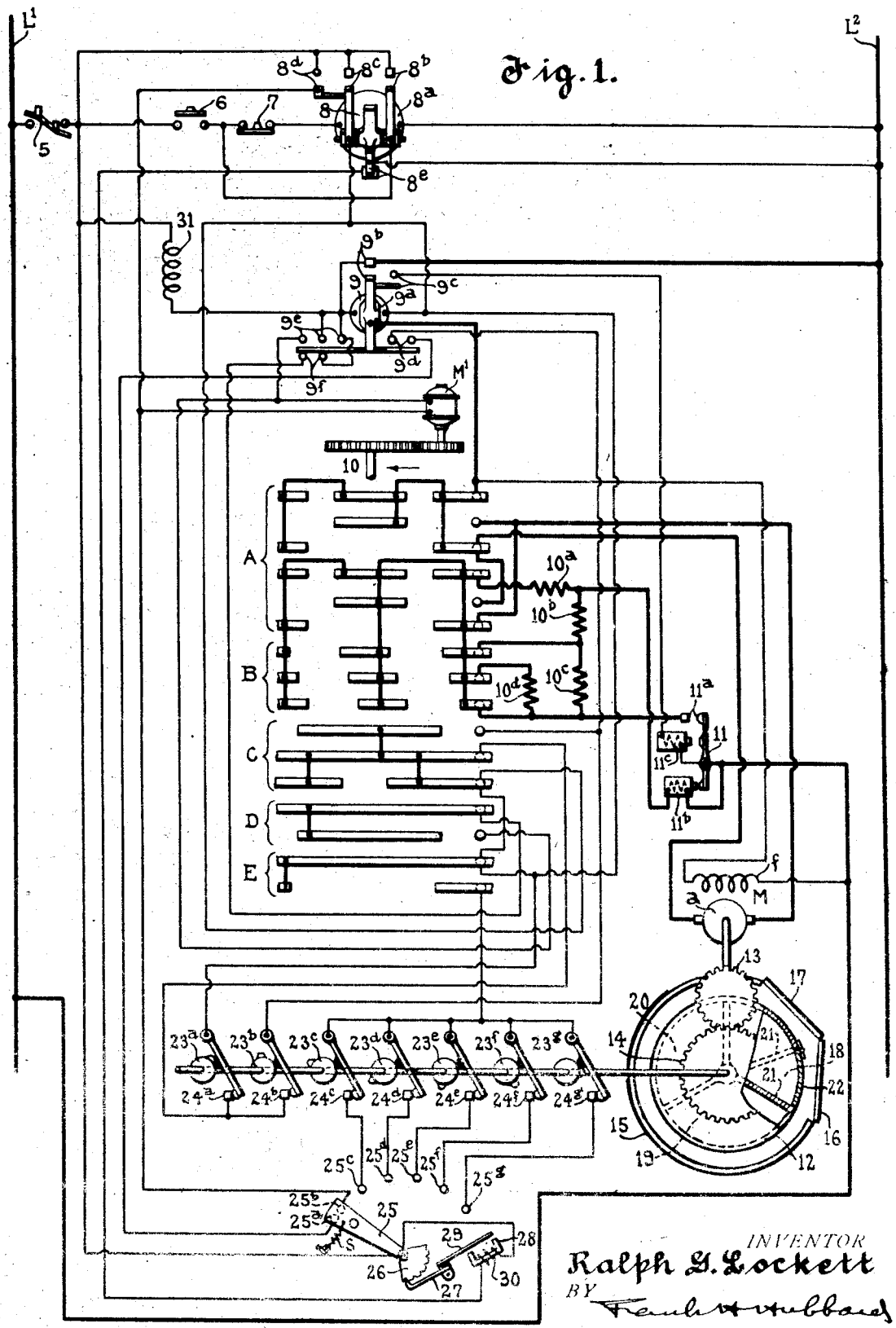

Aug. 16, 1927.

R. G. LOCKETT 1,638,861

CONTROLLER FOR MOTOR DRIVEN DEVICES

Original Filed Jan. 31, 1924    2 Sheets-Sheet 2

INVENTOR
Ralph G. Lockett
BY
ATTORNEY

Patented Aug. 16, 1927.

1,638,861

UNITED STATES PATENT OFFICE.

RALPH G. LOCKETT, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROLLER FOR MOTOR-DRIVEN DEVICES.

Application filed January 31, 1924, Serial No. 689,609. Renewed January 7, 1927.

This invention relates to controllers for motor driven devices, and while not limited thereto, is particularly applicable to controllers for motor driven washing machines and the like.

Such controllers are ordinarily adapted to provide for operation of the washing machine or other driven device in automatically controlled cycles including periodic reversal and acceleration, whereas heretofore great difficulty has been encountered in securing accurately positioned stopping of the driven device under such conditions.

In my copending application filed May 31, 1921, Serial No. 473,997, is disclosed and claimed a certain invention and improvement in controllers for the purposes mentioned, and the present invention has among its objects that of otherwise and further improving controllers for such and analogous purposes.

Another object of the invention is to provide a reversing controller of the aforementioned character enabling accurately positioned stopping of the driven device successively in any of a plurality of predetermined positions.

Another object is that of providing such a reversing controller wherein provision is made for preselecting individually a plurality or multiplicity of stopping positions for the driven device with subsequent automatic stopping thereof in the position preselected, such stopping being effected under such predetermined or standardized conditions of operation of the device as to insure practically uniform drift after termination of the drive.

Another object is to provide a device of the aforementioned character having cooperatively related automatic and manual control instrumentalities for effecting a definite sequence of operation.

Another object is that of providing such a controller wherein provision is made for voluntary preselection of the order of enactment of the several positioned stops, and also for effecting emergency stopping irrespective of the position of the driven element.

Another object is that of providing such a controller wherein provision is made for restarting of the controlled motor under adequate protection irrespective of the conditions under which stopping thereof is effected.

Another object is that of providing a controller adapted to effect stopping of the controlled device under the foregoing conditions and wherein compensation is made for different values or degrees of drift of the moving parts after termination of the supply of energy to the motor, to thereby provide for accurately positioned stopping under differing conditions.

Various other objects and advantages will hereinafter appear.

In devices of the aforementioned character, and particularly with motor driven washing machines in which the washer cylinder is provided with a plurality of circumferentially disposed compartments or pockets for receiving the material to be treated, it is necessary or desirable to provide for acurately positioned stopping of the cylinder in a plurality of distinct positions occurring within a single rotation or other cycle of operation thereof. In accordance with my invention the cylinder is preferably driven by an intermittently reversible motor, and the first stop is made from full speed rotation thereof in either forward or reverse direction, whereas subsequent stops are effected under insured conditions of reduced speed of rotation in one direction only. I will now describe a preferred embodiment of the invention, reference being had to the acompanying drawing, in which, Figure 1 is a schematic and diagrammatic illustration thereof, and Fig. 2 is a simplified diagram of the circuit connections illustrated in Fig. 1.

Figure 2:
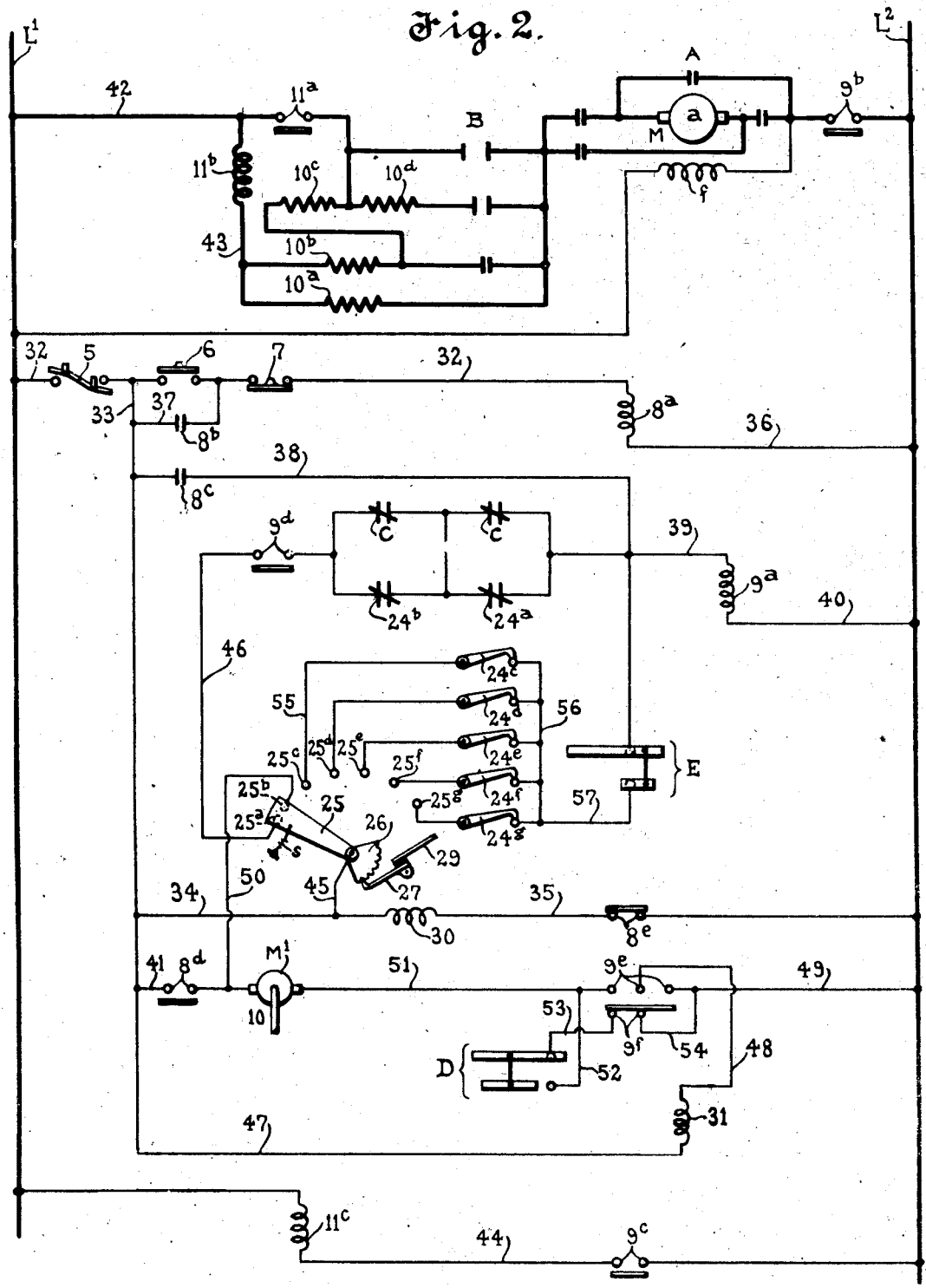

Referring to Fig. 1, the numeral 5 designates a safe or emergency switch adapted when opened to effect stopping of the device independently of the other control instrumentalities hereinafter described. Normally open start pushbutton switch 6 is adapted upon momentary closure thereof to establish starting connections, the circuit closed thereby extending through normally closed stop pushbutton switch 7 and the operating winding 8ª of a relay 8. Relay 8, which is of the double-pole type, is adapted upon closure thereof to provide a maintaining circuit for itself through the right-hand pole contacts $8^b$, shunting switch 6, in a manner hereinafter more fully described. Closure of switch 8 also acts through the left-hand pole contacts $8^c$ to provide an energizing circuit for the operating winding of the main switch 9, switch 8 also including normally open auxiliary contacts $8^d$ and normally closed auxiliary contacts $8^e$.

Main switch 9 aforementioned is provided with an operating winding $9^a$, main contacts $9^b$, normally open auxiliary contacts $9^c$, $9^d$ and $9^e$, and normally closed auxiliary contacts $9^f$.

A pilot motor $M'$ is arranged for joint or alternative control by the aforementioned switches in conjunction with other control instrumentalities hereinafter described, said pilot motor when in operation being arranged to drive at constant speed a controller drum 10, said drum including reversing contact segments indicated generally at A and accelerating contact segments B. Drum 10 is also provided with groups of contact segments C, D and E for purposes hereinafter set forth. Associated with reversing and accelerating contact segments A and B in a well known manner are resistance sections $10^a$, $10^b$, $10^c$ and $10^d$, the three sections last mentioned being adapted for successive inclusion in parallel with the section $10^a$, all of said resistances being thereafter short-circuited to permit full acceleration of the main motor M. The means for effecting such commutation of said resistance sections also includes a lockout switch 11 of known construction, having contacts $11^a$, a series lockout winding $11^b$ and a shunt closing winding $11^c$.

The motor M, which is preferably of the shunt type, is provided with an armature $a$ and field $f$ controlled in the manner hereinafter described. Said motor is arranged to positively drive the cylinder 12 of a washing machine, preferably at considerably reduced speed as by means of the gearing 13 and 14. Cylinder 12 is enclosed within a tub 15 having doors or closures 16 and 17, and said cylinder is provided with a plurality of circumferentially arranged compartments or pockets 18, 19 and 20, the wall 21 of compartment 18 being shown in full lines to indicate such angular positioning of the cylinder as to permit ready removal or unloading of the clothes or other material from said pocket 18 after the washing operation, upon opening of closures 16 and 22. The dotted line position of said wall 21 of compartment 18 serves to illustrate positioning of the cylinder such that said compartment may be readily loaded with clothes to be washed upon opening of closures 17 and 22.

For automatically positioned stopping of cylinder 12 in the first unloading position, illustrated, after initiating the stopping operation, and for thereafter stopping the same in the subsequent loading and unloading positions, a plurality of cam-operated switches are further provided. The cams $23^a$ to $23^g$ of said switches are positively driven by cylinder 12 and arranged in a definite relation with respect thereto, said switches having contacts $24^a$ to $24^g$ to be intermittently opened and closed for a purpose hereinafter set forth. Said cams and their respective contacts are cooperatively related to the control instrumentalities aforementioned and to a manual control switch comprising a movable contact arm 25 and a plurality of stationary contacts $25^a$ to $25^g$; said arm being biased by a spring S, or other suitable means, into engagement with contacts $25^a$ and $25^b$. In this position of arm 25 motor M will be stopped irrespective of the direction of rotation thereof with cylinder 12 in the full line position illustrated after initiation of the stopping operation by momentary depression of stop button 7, but subject to or contingent upon prior full acceleration commutation of the circuit of motor M. After stopping of motor M in the position illustrated, the pilot motor $M'$ will continue in operation until the drum 10 is moved to a position to include parallel resistance sections $10^a$ and $10^b$ in the circuit of armature $a$ of motor M, whereupon the circuit of said pilot motor will be automatically broken, and will remain broken throughout the subsequent loading and unloading operations.

After unloading compartment 18 the same may be moved to the dotted line position to permit loading thereof which movement is effected by bringing arm 25 into engagement with contact $25^c$, whereupon compartment 19 may be moved to unloading position by bringing arm 25 into engagement with contact $25^d$, and so forth until all of the compartments 18, 19 and 20 have been unloaded and loaded, after which the washing operation may be started by momentary depression of start switch 6 in the manner aforedescribed.

Suitable means may be provided for releasably holding arm 25 in engagement with contacts $25^c$ to $25^g$, respectively, and for this purpose I have shown a toothed segment 26 rigidly attached to arm 25, and a pawl 27 adapted for engagement therewith, upon attraction of the arm 29 by electromagnet 28. Said electromagnet includes a coil 30 controlled in the manner to be described.

The means for effecting stopping of motor M with attached cylinder 12 in the desired predetermined positions further includes an electromagnetic brake having a coil 31 adapted upon energization to release the brake and permit free movement of the several parts of the device with respect thereto.

The operation of the device will now be described in connection with the diagram of Fig. 2, like parts in the two figures being designated by like characters of reference and being assumed to be in corresponding relations. Drum 10 will be assumed to be in a position insuring slow speed starting connections for motor M upon initiation of the starting operation. Closure of safe switch 5 serves to connect the controller electrically with line L', only the coil 30, however, being actually energized at this time. The circuit of said coil extends from line L' by conductor 32 through switch 5, by conductors 33 and 34 through said coil, and by conductor 35 through normally closed contacts $8^e$ of relay 8 to line $L^2$.

Upon momentary closure of normally open start switch 6 the energizing circuit for the operating winding $8^a$ of relay 8 is completed, said circuit extending from line L' through switches 5 and 6 and through normally closed stop switch 7, by conductor 32 through said winding $8^a$, and by conductor 36 to line $L^2$. Relay 8 thereupon responds and upon closure of contacts $8^b$ thereof provides a maintaining circuit for its energizing coil $8^a$, shunting the start button 6, said circuit extending from line L' through switch 5, by conductors 33 and 37 through contacts $8^b$ and by conductor 32 to line $L^2$ as previously traced.

Closure of contacts $8^c$ of relay 8 effects energization of the winding $9^a$ of main switch 9, through a circuit extending from line L' through switch 5 by conductors 33 and 38 through said contacts $8^c$, by conductor 39 through said winding $9^a$ and by conductor 40 to line $L^2$.

Contacts $8^d$ of relay 8 upon closure thereof provide an alternative connection between pilot motor M' and line L', shunting the contacts 25 and $25^b$ of the manual control selector switch.

Opening of auxiliary contacts $8^e$ of relay 8 effects deenergization of the coil 30, to thereby provide for automatic positioning of arm 25 in the relation illustrated under the action of the spring S.

Closure of contacts $9^b$ of main switch 9, due to energization of winding $9^a$ in the manner aforedescribed, provides starting connections for motor M, which circuit may be traced from line L' by conductors 42 and 43 through the series winding $11^b$ of lockout switch 11 and through resistance section $10^a$, through certain of the reversing connections A of motor M, through said contacts $9^b$ to line $L^2$.

Auxiliary contacts $9^c$ upon closure provide an energizing circuit for the shunt winding $11^c$ of lockout switch 11, which circuit may be traced from line L' through said winding $11^c$, and by conductor 44 through said contacts $9^c$ to line $L^2$.

Closure of contacts $9^d$ subjects motor M to control for stopping, after initiation of the stopping operation by momentary depression of switch 7, depending upon full speed forward or reverse rotation thereof and concurrent opening of one of the respective sets of contacts $24^b$ or $24^a$, the contact arm 25 of the selector switch being in the position illustrated. Such control is insured by the arrangement of the contacts C on drum 10 in such manner that left-hand contact C will only be disengaged during full acceleration of motor M in a forward direction, whereas right-hand contacts C will only be disengaged during full acceleration of said motor in a reverse direction. Obviously, therefore, an alternative maintaining circuit for winding $9^a$ of main switch 9 will be provided until left-hand contacts C and contacts $24^b$ are simultaneously opened or until right-hand contacts C and contacts $24^a$ are simultaneously opened. Said circuit may be traced from line L' through switch 5, conductors 33, 34 and 45 to contact arm 25, by contact $25^a$ and conductor 46 through contacts $9^d$ and through various combinations of the contacts C, C, $24^b$ and $24^a$, by conductor 39 through winding $9^a$ to line $L^2$ as previously traced.

Main switch 9 is also provided with normally open contacts $9^e$ the first and last of which contacts upon closure through the bridging member effect direct connection of the right-hand side of pilot motor M' to line $L^2$, said portion of the pilot motor circuit being obvious. The middle contact $9^e$ upon closure provides an energizing circuit for the releasing coil 31 of the electromagnetic brake. Said circuit may be traced from line L' through switch 5, by conductors 33 and 47, through said coil 31, by conductor 48 to contacts $9^e$, and by conductor 49 to line $L^2$ which circuit is immediately broken upon opening of main switch 9 to thereby apply the brake.

Thus with motor M started in the manner aforedescribed, with resistance $10^a$ in the motor circuit, continued operation of drum 10 will effect engagement of the next set of accelerating contacts thereon to include resistance section $10^b$ in the motor circuit in parallel with resistance $10^a$. Shunt winding $11^c$ is so calibrated with respect to series winding $11^b$ of lockout switch 11 that the former will thereupon act to effect closure of contacts $11^a$ of said switch to include resistance section $10^c$ in parallel with the parallel sections $10^a$ and $10^b$, the last-mentioned parallel portion of the motor circuit shunting the series winding $11^b$, as will be obvious. Thereafter closure of the next pair of accelerating contacts on drum 10 will effect inclusion of resistance section $10^d$ in the motor circuit in parallel with sections $10^a$, $10^b$, and $10^c$; and upon closure of the next pair of accelerating contacts, all of said resistance sections will be excluded from the motor circuit to permit full acceleration of motor M, in an obvious manner. Motor M will thus continue to accelerate and decelerate upon each reversal thereof through reversing contacts A.

Upon initiation of the stopping operation by momentary depression of stop switch 7, the maintaining circuit for relay 8 will be broken, and said relay will open and remain open throughout the subsequent operations of unloading and loading all of the pockets of the washer cylinder. However, opening of main switch 9 and application of brake 31 will not be effected until left-hand contacts C and contacts 24$^b$ or right-hand contacts C and contacts 24$^a$ are simultaneously disengaged in the manner aforedescribed. Thus stopping of motor M and the attached cylinder from full speed forward or reverse rotation with said cylinder accurately positioned in the first unloading position will be insured.

Opening the main switch 9 effects closure of auxiliary contacts 9$^f$ to thereby maintain energization of the pilot motor M' to drive the drum 10 from a position affording full acceleration in a forward or reverse direction to a position thereof insuring operation of motor M in a forward direction under conditions of limited acceleration. Said circuit of pilot motor M' may be traced from line L' through switch 5, by conductors 33, 34 and 45, through arm 25 and contact 25$^b$ of the manual selector switch, by conductor 50 through said pilot motor, by conductors 51 and 52 through contacts D of drum 10 (which will be in engagement under the conditions aforementioned) by conductor 53 through bridged contacts 9$^f$, and by conductors 54 and 49 to line L$^2$. Pilot motor M will thus continue to drive drum 10 until the lower contact segment D on said drum runs off its cooperating contact,—in which position of drum 10 segments E thereof will be in engagement with their cooperating contacts, to provide for thereafter controlling the starting and stopping operations of motor M through arm 25 and contacts 25$^c$ to 25$^g$ of the manual control switch. Throughout the remaining portion of the cycle of operation of the device pilot motor M' and drum 10 will remain stationary, and relay 8 will remain in open position.

Thus assuming completion of the unloading operation of pocket 18 from the position illustrated in Fig. 1, when it is desired to move said pocket to the loading position indicated in dotted lines, it is only necessary to move arm 25 into engagement with contact 25$^c$, in which position it will be automatically and releasably held, due to energization of coil 30 through normally closed auxiliary contacts 8$^e$ of relay 8. Upon such positioning of arm 25, main switch 9 will be closed and motor M started under conditions of limited acceleration permitted by the inclusion of resistance sections 10$^a$ and 10$^b$ in parallel, whereas it has been found in practice that the cylinder 12 will reach the desired position prior to closure of lockout switch 11 and consequent inclusion of resistance section 10$^c$ in circuit. The energizing circuit for operating winding 9$^a$ of said switch may be traced from line L' through switch 5, conductors 33, 34, 45, contacts 25 and 25$^c$ of the manual selector switch, by conductor 55 through cam-operated washer-driven contacts 24$^c$, by conductors 56 and 57 through contacts E of drum 10, by conductors 38 and 39 through said winding 9$^a$, and by conductor 40 to line L$^2$. Motor M will thus continue to drive the washer cylinder until contacts 24$^c$ are disengaged, which deenergizes winding 9$^a$, opens main switch 9 and effects application of the electromagentic brake to stop motor M with the pocket 18 of the washer cylinder accurately positioned for reloading thereof. Thereafter motor M may be started in like manner by moving arm 25 into engagement with contact 25$^d$ of the manual control switch, main switch 9 being opened and the electromagnetic brake applied upon automatic disengagement of contacts 24$^d$.

The operation of the device thus proceeds in an obvious manner until each of the pockets of the washer cylinder has been unloaded and loaded, whereupon the device may be placed in full operation by momentary depression of start switch 6, which effects closure of relay 8 in the manner aforedescribed. Closure of said relay deenergizes coil 30, through opening of normally closed auxiliary contacts 8$^e$, thereby releasing pawl 27 to permit arm 25 to move into its biased position engaging contacts 25$^a$ and 25$^b$. After completion of the washing operation, the stopping operation of the device is initiated by manual depression of stop switch 7, as aforedescribed,—or any suitable timing mechanism may be employed to effect automatic opening of said switch. The unloading and loading operation then proceeds as previously described.

It will thus be seen that I have provided a comparatively simple and efficient controller for motor driven devices of this character in which the driven part may be accurately stopped successively in the desired positions, the drift of the motor with its attached parts being definitely regulated and controlled under the various conditions.

What I claim as new and desire to secure by Letters Patent is:

1. In a motor controller adapted to effect periodic reversal of operation of the driven device, the combination with means to preset the controller for stopping and for preselecting individually a plurality of positions for stopping of the device, of associated means providing for subsequent automatically positioned stopping of the device in preselected position.

2. In a controller for motor driven devices, in combination, means to direct stopping of the device, and means for rendering the former means ineffective for stopping pending movement of the device to one of a number of preselectable positions and concurrent operation thereof at a given speed.

3. In a controller for motor driven devices, in combination, means to direct stopping of the device, and means for rendering the former means ineffective for stopping pending movement of the device to a predetermined position and concurrent operation thereof at a given speed, said second-mentioned means providing for thereafter starting and stopping the motor to effect movement of said driven device to other predetermined positions successively.

4. In a controller for motor driven devices, in combination, means for stopping said driven device in a plurality of predetermined positions successively, said means including means rendering the same ineffective for stopping pending given accelerating conditions of the motor circuit.

5. In a controller for motor driven devices, in combination, a driven element, a motor for driving the same, means to direct stopping of said motor, means for rendering said former means ineffective for stopping pending movement of said driven element to a predetermined position and concurrent operation of the motor at a given speed, said second mentioned means providing for thereafter starting and stopping said motor independently of said first mentioned means.

6. In a controller for motor driven devices, in combination, a driven element, a motor for driving the same, means to direct stopping of said motor, means including manual control means for rendering said former means ineffective for stopping pending movement of a part of said driven element to predetermined position and concurrent operation of the motor at a given speed, said second mentioned means providing for thereafter starting said motor and stopping the same independently of said first mentioned means under conditions of reduced speed upon movement of said part to another predetermined position.

7. In a controller for motor driven devices, in combination, a driven element, a motor for driving the same, means for periodically reversing said motor and preselecting means for stopping said driven element in a plurality of predetermined angular positions successively subject to attainment of given accelerating conditions of the motor circuit.

8. In a controller for motor operated devices, the combination with means for effecting cyclic control of the device including periodic reversal of operation thereof, of means providing for automatically positioned stopping of the device in a plurality of preselectable relations occurring within each cycle of operation thereof and associated voluntary control means for rendering said latter mentioned means effective.

9. In a controller for motor driven devices, in combination, means for periodically reversing the operation of the driven device, means simulating the operation of said driven device and cooperatively related to said reversing means, means to direct stopping of the device, means to automatically maintain the device in operation pending a given cooperative relation of said reversing means and said second mentioned means, and means for thereafter starting and stopping said motor independently of said first mentioned stopping means.

10. In a controller for motor operated devices, the combination with means providing automatic cyclic control of operation of the device, said control including periodic reversal, of means providing for automatically positioned stopping of the device in a plurality of preselectable definite relations, and means for preselecting such relations individually at will, said last mentioned means having associated parts to provide for restarting the device after stopping thereof.

11. In a controller for motor operated devices, the combination with means providing automatic cyclic control of operation of the device, said control including periodic reversal, of means providing for automatically positioned stopping of the device in a plurality of preselectable definite relations, and means for preselecting such relations individually at will, said last mentioned means having associated parts to provide for restarting the device after stopping thereof and concurrently to effect further preselection of said stopping relations.

12. In a device of the character described, in combination, a periodically reversible driving motor, an element driven thereby, means for automatically accelerating and decelerating said motor upon each reversal thereof, means to direct stopping of said motor, means to render said last mentioned means ineffective for stopping pending full acceleration of said motor in either direction and coincident predetermined positioning of said driven element, and means for subsequently starting and stopping said motor under insured conditions of limited acceleration.

13. In a device of the character described, in combination, a periodically reversible driving motor, an element driven thereby, means for automatically accelerating and decelerating said motor upon each reversal thereof, means to direct stopping of said motor, means to render said last mentioned means ineffective for stopping pending full acceleration of said motor in either direction and coincident predetermined positioning of said driven element, means for subsequently starting and stopping said motor under insured conditions of limited acceleration and manually controlled preselecting means for rendering subsequent stopping of said motor subject to predetermined positioning of said driven element.

14. In a controller for motor driven washing machines, in combination, a washer cylinder having a plurality of circumferentially arranged compartments, a periodically reversible motor for rotatably driving the same, control means for said motor including means to direct stopping thereof, means rendering said first mentioned means ineffective for stopping pending operation of said cylinder at a given speed and concurrent movement thereof to a predetermined angular position, and means for thereafter stopping said motor with said cylinder in different angular positions under conditions of reduced speed.

15. In a controller for motor driven washing machines, in combination, a washer cylinder having a plurality of circumferentially arranged compartments, a periodically reversible motor for rotatably driving the same, control means for said motor including means to direct stopping thereof, means rendering said first mentioned means ineffective for stopping pending operation of said motor at a given speed and concurrent movement of the cylinder to a predetermined angular position, and means for thereafter stopping said motor with the cylinder in different angular positions successively under insured conditions of reduced speed.

16. In a controller for motor driven washing machines, in combination, a washer cylinder having a plurality of circumferentially arranged compartments, a periodically reversible motor for rotatably driving the same, control means for said motor including means to direct stopping thereof, means rendering said first mentioned means ineffective for stopping pending operation of said motor at a given speed in either direction and concurrent movement of the cylinder to a predetermined angular position, and means for thereafter stopping said motor with the cylinder in different angular positions under insured conditions of reduced speed and unidirectional travel.

17. In a controller for motor driven washing machines, in combination, a washer cylinder having a plurality of circumferentially arranged compartments, a periodically reversible motor for rotatably driving the same, control means for said motor including means to direct stopping thereof, means rendering said first mentioned means ineffective for stopping pending operation of said motor at a given speed in either direction and concurrent movement of the cylinder to a predetermined angular position, and manual controlled means for thereafter directing stopping of said motor with the cylinder in different angular positions under insured conditions of reduced speed and unidirectional travel.

In witness whereof, I have hereunto subscribe my name.

RALPH G. LOCKETT.